United States Patent
Seo

(10) Patent No.: US 10,407,643 B2
(45) Date of Patent: Sep. 10, 2019

(54) APPARATUS AND METHOD FOR REGENERATING LUBRICATING OIL

(71) Applicant: Hyundai Motor Company, Seoul (KR)

(72) Inventor: Jung Min Seo, Gwangmyeong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 179 days.

(21) Appl. No.: 15/368,245

(22) Filed: Dec. 2, 2016

(65) Prior Publication Data

US 2018/0112151 A1  Apr. 26, 2018

(30) Foreign Application Priority Data

Oct. 24, 2016 (KR) .................. 10-2016-0138716

(51) Int. Cl.
| | |
|---|---|
| *C10M 175/00* | (2006.01) |
| *B01D 17/02* | (2006.01) |
| *B01D 17/04* | (2006.01) |
| *B01D 1/00* | (2006.01) |

(52) U.S. Cl.
CPC ..... *C10M 175/0033* (2013.01); *B01D 1/0058* (2013.01); *B01D 1/0082* (2013.01); *B01D 17/0208* (2013.01); *B01D 17/042* (2013.01); *C10M 175/0091* (2013.01); *C10N 2240/10* (2013.01)

(58) Field of Classification Search
CPC .......... C10M 175/00; C10M 175/0091; C10M 175/033; B01D 1/0058; B01D 1/0082; B01D 17/0208; B01D 17/042
See application file for complete search history.

(56) References Cited

U.S. PATENT DOCUMENTS

| | | | | |
|---|---|---|---|---|
| 3,915,860 A | * | 10/1975 | Priest ................... | B01D 35/185 |
| | | | | 196/46.1 |
| 4,604,037 A | * | 8/1986 | Hoya ...................... | F04B 15/02 |
| | | | | 417/390 |
| 6,981,377 B2 | | 1/2006 | Vaynberg et al. | |

(Continued)

FOREIGN PATENT DOCUMENTS

| | | | | |
|---|---|---|---|---|
| CN | 103343734 A | | 10/2013 | |
| CN | 204364941 | * | 6/2015 | ............. B01D 15/00 |
| CN | 207102595 | * | 3/2018 | ............. B01J 19/18 |

(Continued)

OTHER PUBLICATIONS

Miller, S.A. et al. (1984) "Liquid-Solid Systems" in Perry's Chemical Engineers' Handbook, 6th edition, McGraw-Hill, 2240 pgs (Office action cites p. 19-74).*

(Continued)

*Primary Examiner* — Brian A McCaig
(74) *Attorney, Agent, or Firm* — Slater Matsil, LLP

(57) ABSTRACT

An apparatus includes a lubricating oil tank storing a lubricating oil. An oil separator separates the lubricating oil from a working fluid discharged from an expander of a waste heat recovery system. A lubricating oil return conduit is connected between the oil separator and the lubricating oil tank. A working fluid return conduit is connected between the lubricating oil tank and the oil separator. A vaporizer unit is installed in the lubricating oil tank to vaporize a liquefied working fluid mixed with the separated lubricating oil in the lubricating oil tank.

12 Claims, 7 Drawing Sheets

(56) References Cited

U.S. PATENT DOCUMENTS

2008/0070816 A1* 3/2008 Martin de Julian ........................ C10M 175/0008
508/111
2009/0025399 A1 1/2009 Kamen et al.

FOREIGN PATENT DOCUMENTS

| JP | 2016020783 A | 2/2016 |
| KR | 20090060856 A | 6/2009 |
| KR | 20130082511 A | 7/2013 |
| KR | 20150062683 A | 6/2015 |
| KR | 101614928 B1 | 4/2016 |

OTHER PUBLICATIONS

Machine translation of CN207102595, Mar. 2018.*
Machine translation of CN204364941, Jun. 2015.*

* cited by examiner

APPARATUS AND METHOD FOR REGENERATING LUBRICATING OIL

CROSS-REFERENCE TO RELATED APPLICATIONS

This application is based on and claims the benefit of priority to Korean Patent Application No. 10-2016-0138716, filed on Oct. 24, 2016 in the Korean Intellectual Property Office, the disclosure of which is incorporated herein in its entirety by reference.

TECHNICAL FIELD

The present disclosure relates to an apparatus and a method for regenerating lubricating oil, and more particularly, to an apparatus and a method for regenerating lubricating oil capable of improving lubricating performance of the lubricating oil and heat exchange performance of a working fluid by effectively separating the lubricating oil from the working fluid.

BACKGROUND

An internal combustion engine has been widely used in a vehicle, a ship, a small generator, or the like and an attempt to improve efficiency of the internal combustion engine has been continuously conducted. In the internal combustion engine, a large quantity of heat is generally discharged as waste heat. For this reason, a waste heat recovery system for increasing the overall efficiency of the internal combustion engine by recovering the waste heat as energy has been developed.

The waste heat recovery system is configured to recover waste heat discharged from an engine as energy, convert the recovered energy into electric energy or mechanical energy, and utilize the converted energy in the engine of the vehicle, other accessories, or the like.

The waste heat recovery system is configured to include a Rankine cycle to very effectively recover the waste heat of the engine. The Rankine cycle includes a circulation path through which a working medium is circulated, in which the circulation path of the Rankine cycle includes a boiler (evaporator) configured to heat and evaporate the working medium by the waste heat (heat from exhaust gas and/or heat from EGR gas) of the engine, an expander configured to expand the gaseous working medium supplied from the boiler to generate rotational energy, an condenser configured to condense the working medium discharged from the expander, and a pump configured to circulate the working medium on the circulation path.

The expander is the most important part in the overall performance and durability of the waste heat recovery system and is directly exposed to highest temperature and pressure working medium within the waste heat recovery system and continuously rotated, and therefore is the most likely to be damaged.

Meanwhile, an expander for recovering waste heat that is currently under development is basically a turbine type expander. To prevent rotating parts, such as a bearing in a turbine that rotates at a high speed of 100,000 rpm or more, from being worn and damaged, there is a need to supply lubricating oil to the expander and the rotating parts such as a reducer connected to the expander while the waste heat recovery system is operated.

However, due to characteristics of the turbine type expander, some of the lubricating oil may be introduced into a working fluid conduit of the waste heat recovery system while being mixed with the working fluid. As such, if the lubricating oil is circulated while being mixed with the working fluid, the lubricating oil generates an oil film inside a heat exchanger, such that heat transfer efficiency may be reduced and the durability of the expander may be reduced due to a lack of lubricating oil.

To cope with the problem, a structure in which an oil separator is installed at a downstream side of the expander to separate the lubricating oil mixed with the working fluid and the separated lubricating oil is recovered to a lubricating oil tank is currently under development.

However, the lubricating oil recovered to the lubricating oil tank through the oil separator may be mixed with the working fluid, and therefore it is likely to introduce the working fluid into the lubricating oil tank. As such, if the working fluid introduced into the lubricating oil is not separated, the lubricating performance may be reduced and the working fluid may overflow the lubricating oil tank in excess of storage capacity of the lubricating oil tank.

SUMMARY

The present disclosure has been made to solve the above-mentioned problems occurring in the prior art while advantages achieved by the prior art are maintained intact.

An aspect of the present disclosure provides an apparatus and a method for regenerating lubricating oil capable of improving lubricating performance of the lubricating oil and heat exchange performance of a working fluid by effectively separating the lubricating oil from the working fluid.

According to an exemplary embodiment of the present disclosure, an apparatus for regenerating lubricating oil in which an oil separator separates the lubricating oil from a working fluid discharged from an expander of a waste heat recovery system and the working fluid of the lubricating oil tank is separated when the working fluid is introduced into a lubricating oil tank while some thereof is mixed with the separated lubricating oil and recovered to the oil separator includes: the lubricating oil tank storing the lubricating oil; the oil separator separating the lubricating oil from the working fluid discharged from the expander of the waste heat recovery system; a lubricating oil return conduit connected between the oil separator and the lubricating oil tank; a working fluid return conduit connected between the lubricating oil tank and the oil separator; and a vaporizer unit installed in the lubricating oil tank to vaporize a liquefied working fluid.

According to another exemplary embodiment of the present disclosure, a method for regenerating lubricating oil in which an oil separator separates the lubricating oil from a working fluid discharged from an expander of a waste heat recovery system and the working fluid of the lubricating oil tank is separated when the working fluid is introduced into a lubricating oil tank while some thereof is mixed with the separated lubricating oil and recovered to the oil separator includes: calculating a saturated steam temperature of the working fluid depending on an internal pressure of the oil separator; setting a heating target temperature of a vaporizer unit depending on the saturated steam temperature of the working fluid; measuring an internal temperature of the lubricating oil tank if the heating target temperature is below a vaporization temperature of the lubricating oil; and operating the vaporizer unit if the internal temperature of the lubricating oil tank is below the heating target temperature.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION OF ILLUSTRATIVE EMBODIMENTS

Figure 1:
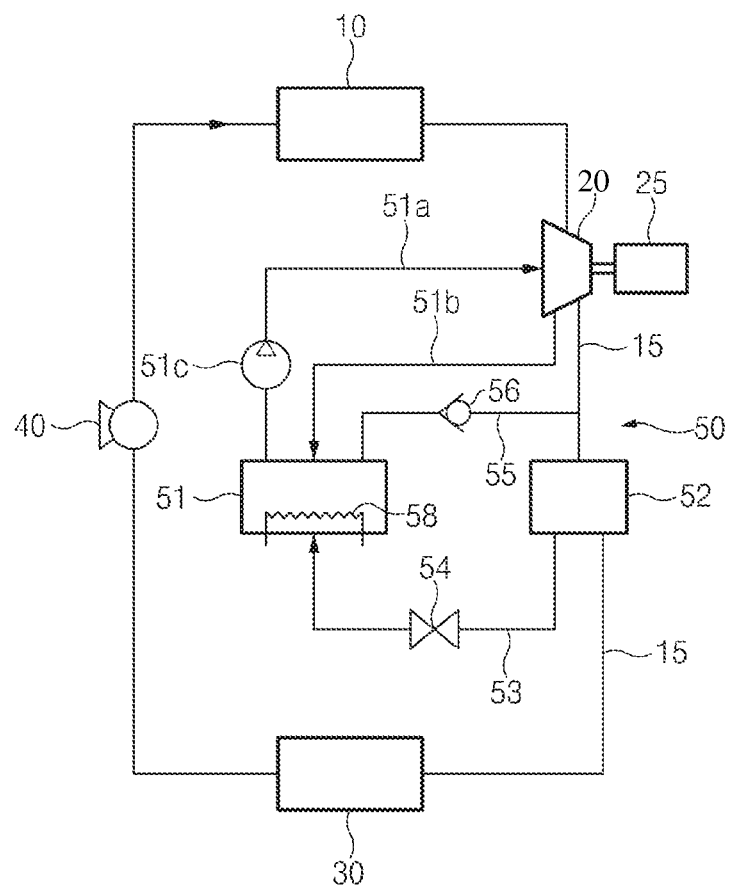
FIG. 1 is a diagram illustrating a state in which an apparatus for regenerating lubricating oil according to an exemplary embodiment of the present disclosure is applied to a waste heat recovery system.

Hereinafter, exemplary embodiments of the present disclosure will be described in detail with reference to the accompanying drawings. For reference, a size, a thickness of a line, and the like of components which are illustrated in the drawing referenced for describing exemplary embodiments of the present disclosure may be slightly exaggerated for convenience of understanding. Further, terms used to describe the present disclosure are defined in consideration of functions in the present disclosure and therefore may be changed depending on an intention, a practice, and the like of a user and an operator. Therefore, the definition of the terminologies should be construed based on the contents throughout the specification.

FIG. 1 is a diagram illustrating one example of a general waste heat recovery system.

Referring to FIG. 1, a waste heat recovery system may include a working fluid conduit 15 through which a working medium is circulated, in which the working fluid conduit 15 may include a boiler 10 configured to heat and evaporate the working medium by waste heat (heat from exhaust gas and/or heat from EGR gas) of an engine, an expander 20 configured to expand the gaseous working medium supplied from the boiler to generate rotational energy, and an condenser 30 configured to condense the working medium discharged from the expander, and a circulation pump 40 configured to circulate the working fluid in the working fluid conduit 15.

Further, a reservoir tank (not illustrated) configured to store a liquefied working medium from the condenser 30 may be installed between the condenser 30 and the circulation pump 40 and the reservoir tank (not illustrated) may keep on storing the liquefied working medium supplied from the condenser 30, such that the working medium may be more smoothly circulated.

The boiler 10 may be configured to be installed at one side of an exhaust pipe to exchange heat between the exhaust gas and the working medium and a super heater (not illustrated) heating the working medium by EGR gas may also be installed between the boiler 10 and the expander 20.

Meanwhile, the working fluid discharged from the expander 20 is in the state in which it is mixed with the lubricating oil and the working fluid with which the lubricating oil is mixed may be introduced into an oil separator 52. The oil separator 52 may separate the lubricating oil from the working fluid and the so separated lubricating oil may be recovered to a lubricating oil tank 51.

An apparatus 50 for regenerating lubricating oil according to the exemplary embodiment of the present disclosure may separate some of the working fluid mixed with the lubricating oil recovered to the lubricating oil tank 51 and recover the separated working fluid to the oil separator 52, and therefore the oil separator 52 separates the lubricating oil from the working fluid again to improve separation efficiency of the working fluid and the lubricating oil, thereby improving heat exchange performance of the working fluid and lubrication performance of the lubricating oil, respectively.

Referring to FIGS. 2 to 5, the apparatus 50 for regenerating lubricating oil according to the exemplary embodiment of the present disclosure may include the lubricating oil tank 51, the oil separator 52 configured to be disposed at a downstream side of the expander 20, a lubricating oil return conduit 53 configured to be connected between the lubricating oil tank 51 and the oil separator 52, and a working fluid return conduit 55 configured to be connected between the lubricating oil tank 51 and the oil separator 52.

The lubricating oil tank 51 may be configured to have a predetermined amount of lubricating oil stored therein. The lubricating oil tank 51 may be connected to a lubricating oil supply conduit 51a and a lubricating oil collect conduit 51b, in which the lubricating oil supply conduit may be provided with a lubricating oil supply pump 51c. The lubricating oil supply pump sic may supply the lubricating oil from the lubricating oil tank 51 to the expander 20 through the lubricating oil supply conduit 51a and the lubricating oil supplied to the expander 20 and a rotating part (bearing, etc.) of a reducer 25 connected to the expander 20 may be collected from the expander 20 to the lubricating oil tank 51 through the lubricating oil collect conduit 51b.

The oil separator 52 may be installed at the downstream side of the expander 20, in particular, on the working fluid conduit 15 between the expander 20 and the condenser 30.

Figure 4:
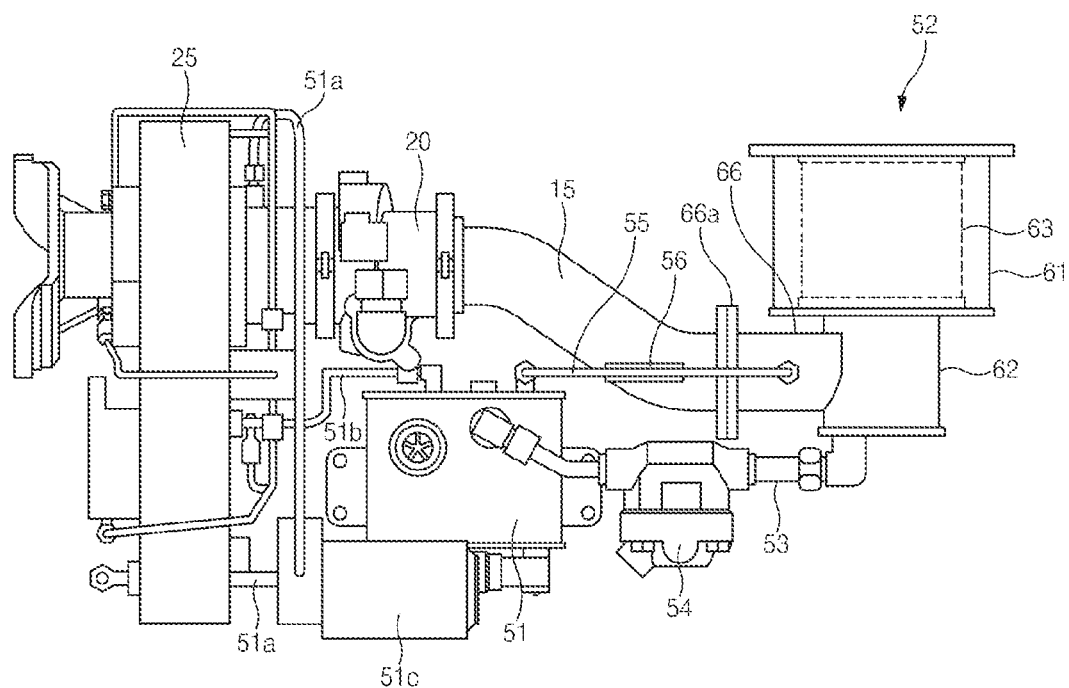
FIG. 4 is a diagram illustrating the apparatus of regenerating lubricating oil according to the exemplary embodiment of the present disclosure.
Figure 5:
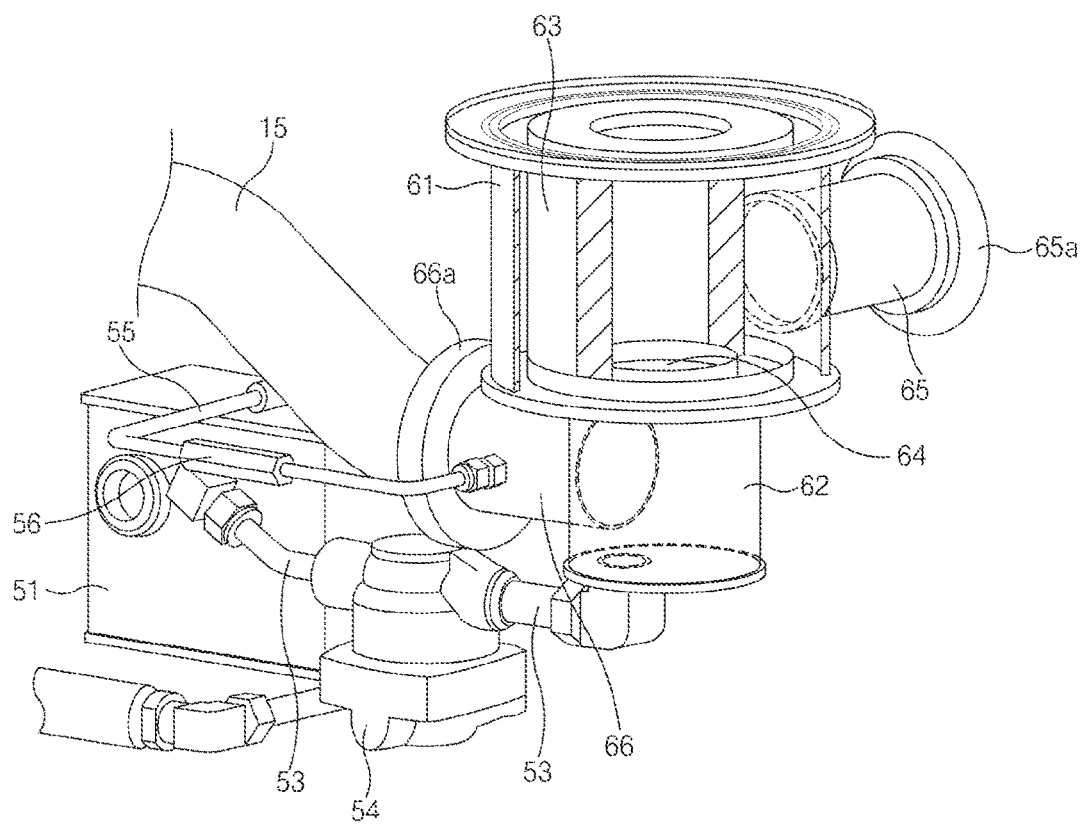
FIG. 5 is a perspective view illustrating a connection structure between an oil separator of the apparatus for regenerating lubricating oil according to the exemplary embodiment of the present disclosure and a lubricating oil tank.

As illustrated in FIGS. 4 and 5, the oil separator 52 may have an upper cylindrical part 61 and a lower cylindrical part 62.

The upper cylindrical part 61 may have a volume larger than that of the lower cylindrical part 62 and an inside of the upper cylindrical part 61 may be provided with an annular filter 63. A bottom surface of the upper cylindrical part 61 may be provided with a communication hole 64 that communicates with the lower cylindrical part 62. One side of the upper cylindrical part 61 may be provided with an outlet through which the working fluid is discharged and the outlet of the upper cylindrical part 61 may be connected to an outlet pipe 65. The outlet pipe 65 may be provided with a flange 65a that is sealingly coupled with the working fluid conduit 15.

The lower cylindrical part 62 may be installed under the upper cylindrical part 61, one side of the lower cylindrical part 62 may be provided with an inlet into which a fluid in which the working fluid and the lubricating oil are mixed is introduced, and the inlet may be connected to an inlet pipe 66. The inlet pipe 66 may be provided with a flange 66a that is sealingly coupled with the working fluid conduit 15.

According to the structure of the oil separator 52, the working fluid mixed with the lubricating oil may be introduced into the lower cylindrical part 62 through the inlet pipe 66 of the lower cylindrical part 62 to collide with an inner wall surface of the lower cylindrical part 62, and thus the lubricating oil may be primarily separated from the working fluid and the lubricating oil may be secondarily separated while the working fluid passes through the filter 63 of the upper cylindrical part 61.

An inlet end of the lubricating oil return conduit 53 may be connected to a bottom surface of the lower cylindrical part 62 of the oil separator 52 and an outlet end of the lubricating oil return conduit 53 may be connected to one side of the lubricating oil tank 51.

An opening and closing valve may be installed on the way of the lubricating oil return conduit 53. For example, the opening and closing valve may be configured as an opened floating valve when a pressure of the waste heat recovery system, in particular, a pressure of the oil separator 52 is larger than that of the lubricating oil tank 51.

The lubricating oil separated by the oil separator 52 moves to the lower cylindrical part 62 through the communication hole 64 by gravity and the liquefied lubricating oil moving to the lower cylindrical part 62 may be collected to the floating valve 54 through the lubricating oil return conduit 53. When the pressure of the waste heat recovery system, in particular, the pressure of the oil separator 52 is larger than that of the lubricating oil tank 51, the floating valve 54 is opened, and therefore the liquefied lubricating oil separated from the working fluid may be recovered to the lubricating oil tank 51.

Figure 2:
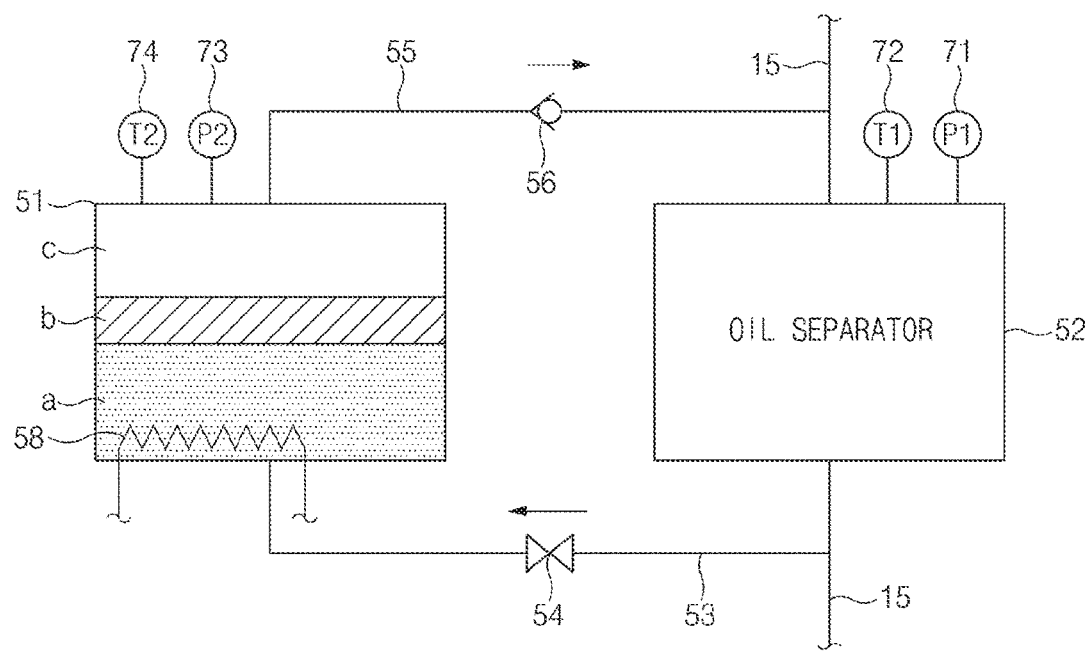
FIG. 2 is a block diagram illustrating the apparatus of regenerating lubricating oil according to the exemplary embodiment of the present disclosure.

Meanwhile, the gaseous working fluid may be introduced into the lubricating oil tank 51 through the lubricating oil return conduit 53 along with the liquefied lubricating oil. Further, when an internal average temperature of the oil separator 52 is equal to or higher than a saturated steam temperature, the working fluid liquefied due to a local heat loss in the oil separator 52 may be introduced into the lubricating oil tank 51 through the lubricating oil return conduit 53. As illustrated in FIG. 2, the inside of the lubricating oil tank 51 may be sequentially provided with a lubricating oil layer a, a liquefied working fluid layer b, and a gaseous working fluid layer c from bottom to top. The tendency is highly likely to occur when the waste heat recovery system stops.

As such, when the liquefied or gaseous working fluid is introduced into the lubricating oil tank 51 along with the lubricating oil and when the working fluid is supplied to the expander 20, the reducer 25, etc., along with the lubricating oil, the lubricating performance may be reduced and the working fluid may also overflow in excess of the storage capacity of the lubricating oil tank 51.

According to the exemplary embodiment of the present disclosure, the working fluid return conduit 55 may be configured to be connected between the lubricating oil tank 51 and the oil separator 52. The working fluid in the lubricating oil tank 51 may be recovered to the oil separator 52 through the working fluid return conduit 55.

According to the exemplary embodiment of the present disclosure, the inlet end of the working fluid return conduit 55 is connected to a top portion of the lubricating oil tank 51 and the outlet end of the working fluid return conduit 55 may be connected to an upstream side of the oil separator 52. Accordingly, the working fluid may be more smoothly recovered from the lubricating oil tank 51 to the oil separator 52.

The inside of the lubricating oil tank 51 may be provided with first and second vaporizer units 58 and 59 that vaporizes the liquefied working fluid.

The first and second vaporizer units 58 and 59 may be configured to heat the internal temperature of the lubricating oil tank 51 depending on a vaporization temperature of the working fluid.

According to the exemplary embodiment of the present disclosure, a heating temperature of the first and second vaporizer units 58 and 59 may be lower than the vaporization temperature of the lubricating oil and may be set to correspond to the vaporization temperature of the working fluid. The reason is that the vaporization temperature of the working fluid is set to be relatively lower than the vaporization temperature of the lubricating oil. For example, when the vaporization temperature of the working fluid is about 90 to 100° C., the vaporization temperature of the lubricating oil may be approximately 140° C., and therefore if the first and second vaporizer units 58 and 59 heat the internal temperature of the lubricating oil tank 51 at approximately 90 to 100° C. depending on the vaporization temperature of the working fluid, the lubricating oil may not be vaporized. If the lubricating oil is not vaporized by setting the heating temperature of the first and second vaporizer units 58 and 59, only the liquefied working fluid may be smoothly vaporized.

According to the exemplary embodiment of the present disclosure, as illustrated in FIG. 2, the vaporizer unit may also be configured as an electric heat type heater such as a heating coil generating heat depending on application of power.

Figure 3:
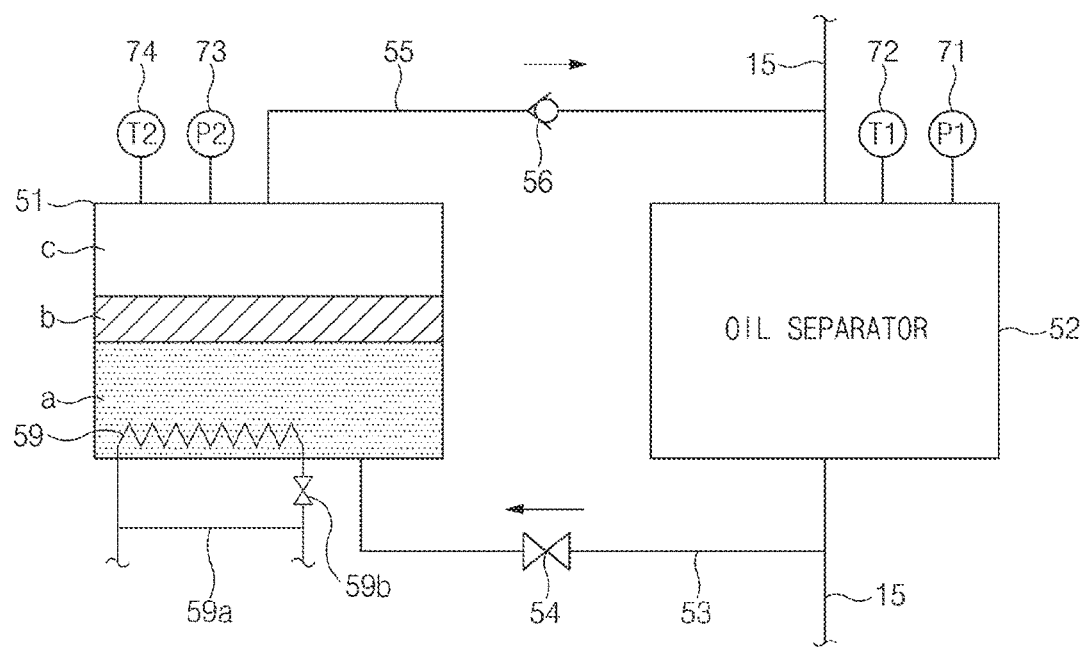
FIG. 3 is a block diagram illustrating a changed example of the apparatus for regenerating lubricating oil illustrated in FIG. 2.

According to another exemplary embodiment of the present disclosure, as illustrated in FIG. 3, the second vaporizer unit 59 may also be configured as a cooling water line through which engine cooling water elevated after cooling the engine passes and the cooling water line may have a structure in which it penetrates through the lubricating oil tank 51. An inlet and an outlet of the cooling water line may be connected to a bypass line 59a and an inlet side of the cooling water line may be provided with a valve 59b. For example, after the engine cooling water elevated after cooling the engine may have a temperature of approximately 90° C. and if the vaporization temperature of the working fluid is equal to or less than 90° C., the working fluid may be vaporized by the engine cooling water of approximately 90° C.

A oneway valve may be installed on the way of the working fluid return conduit 55 and the oneway valve 56 may be configured to permit the movement of the working fluid from the lubricating oil tank 51 to the oil separator 52 and block a reflow from the oil separator 52 to the lubricating oil tank 51.

According to the exemplary embodiment of the present disclosure, the oneway valve 56 may be configured to be open when the internal pressure of the lubricating oil tank 51 is higher than that of the oil separator 52.

For example, when the lubricating oil tank 51 is not heated by the first and second vaporizer units 58 and 59, the internal pressure of the lubricating oil tank 51 is approximately 1 to 3 bars and when the internal pressure of the oil separator 52 is equal to or higher than approximately 2 to 5 bar, the oneway valve 56 is closed. Further, if the working fluid in the lubricating oil tank 51 is continuously vaporized by the first and second vaporizer units 58 and 59, the internal pressure of the lubricating oil tank 51 is larger than that of the oil separator 52 and thus the oneway valve 56 may be open, such that the working fluid vaporized in the lubricating oil tank 51 may be recovered to the oil separator 52 through the working fluid return conduit 55.

Further, even when the floating valve 54 is opened, the internal pressure of the lubricating oil tank 51 is temporarily larger than that of the oil separator 52 and thus the oneway valve 56 may be open, such that the working fluid may be recovered to the oil separator 52.

Meanwhile, the oil separator 52 may be provided with a first pressure sensor 71 measuring an internal pressure $P_1$ of the oil separator 52 and a first temperature sensor 72 measuring an internal temperature $T_1$ of the oil separator 52.

Further, the lubricating oil tank 51 may be provided with a second pressure sensor 73 measuring an internal pressure $P_2$ of the lubricating oil tank 51 and a second temperature sensor 74 measuring an internal temperature $T_2$ of the lubricating oil tank 51.

Further, the first pressure sensor 71, the first temperature sensor 72, the second pressure sensor 73, the second temperature sensor 74, the first and second vaporizer units 58 and 59, or the like may be connected to a controller (not illustrated) such as ECU of a vehicle and the controller (not illustrated) may control the operations of the first pressure sensor 71, the first temperature sensor 72, the second pressure sensor 73, the second temperature sensor 74, the first and second vaporizer units 58 and 59, or the like to perform a lubricating oil regeneration control.

Figure 6:
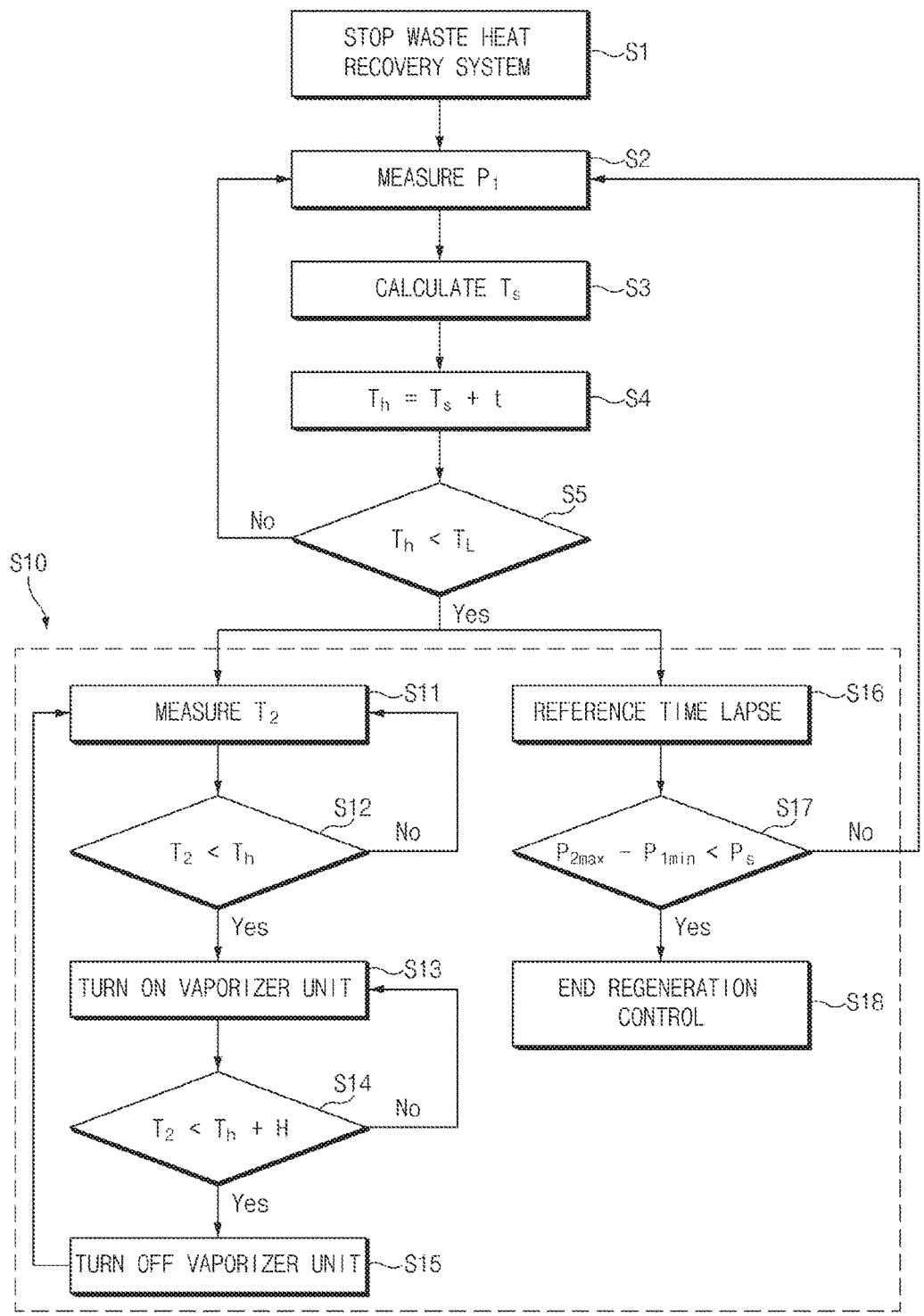
FIG. 6 is a flow chart illustrating a method for regenerating lubricating oil according to an exemplary embodiment of the present disclosure when a waste heat recovery system stops.

FIG. 6 is a flow chart illustrating a method for regenerating lubricating oil according to an exemplary embodiment of the present disclosure when a waste heat recovery system stops.

If the waste heat recovery system stops (S1), the internal pressure $P_1$ of the oil separator 52 is measured by the first pressure sensor 71 (S2).

Next, a saturated vaporization temperature $T_s$ of the working fluid is calculated by substituting the internal pressure $P_1$ of the oil separator 52 into a PV diagram of the Rankine cycle, or the like (S3).

Further, a heating target temperature $T_h$ of the first and second vaporizer units 58 and 59 are set depending on the saturated steam temperature of the working fluid (S4). According to the exemplary embodiment of the present disclosure, the heating target temperature $T_h$ may be set by adding a predetermined margin t to the saturated steam temperature of the working fluid. ($T_h = T_s + t$).

Further, it is determined whether the heating target temperature $T_h$ is below a vaporization temperature $T_L$ of the lubricating oil (S5). This is to prevent the lubricating oil from being vaporized when the heating target temperature $T_h$ exceeds the vaporization temperature $T_L$ of the lubricating oil.

In the step S5, if the heating target temperature $T_h$ is equal to or higher than the vaporization temperature $T_L$ of the lubricating oil, the method returns to the step S2 to reset (correct) the heating target temperature $T_h$ and if the heating target temperature $T_h$ is below the vaporization temperature $T_L$ of the lubricating oil, a sub logic (S10) is performed.

The sub logic (S10) may operate and stop the first and second vaporizer units 58 and 59 depending on the change in the internal temperature of the lubricating oil tank 51 to control the temperature of the lubricating oil tank 51 (S11, S12, S13, S14, and S15), and at the same time may determine the ending of the control logic by monitoring the change in internal pressure of the lubricating oil tank 51 depending on a preset time interval or reset (correct) the heating target temperature (S16, S17, and S18).

Describing the logic controlling the temperature of the lubricating oil tank 51 in the sub logic (S10), the internal temperature $T_2$ of the lubricating oil tank 51 is measured by the second temperature sensor 74 (S11) and it is determined whether the internal temperature $T_2$ of the lubricating oil tank 51 is lower than the heating target temperature $T_h$ (S12).

In the step S12, if the internal temperature $T_2$ of the lubricating oil tank 51 is lower than the heating target temperature $T_h$, the first and second vaporizer units 58 and 59 are operated (S13). Here, when the vaporizer unit is the electric heat type heater of FIG. 2, power may be applied to the electric heat type heater to operate the vaporizer unit. Further, when the second vaporizer unit 59 is the cooling water line of FIG. 3, a valve 59b is opened to pass the elevated engine cooling water through the cooling water line, thereby operating the second vaporizer unit 59.

In the step S12, if the internal temperature $T_2$ of the lubricating oil tank 51 is higher than the heating target temperature $T_h$, the method proceeds to the step S11.

Next, it is determined whether the internal temperature $T_2$ of the lubricating oil tank 51 is higher than the heating target temperature $T_h$ (S14). According to the exemplary embodiment of the present disclosure, it is determined whether the internal temperature $T_2$ of the lubricating oil tank 51 rises to be higher than the heating target temperature $T_h$ by a set rising value H ($T_2 > T_h + H$) (S14). For example, the rising value H may be approximately 10° C. and therefore it is determined whether the internal temperature $T_2$ of the lubricating oil tank 51 rises 10° C. higher than the heating target temperature $T_h$.

In the step S14, if it is determined whether the internal temperature $T_2$ of the lubricating oil tank 51 rises to be higher than the heating target temperature $T_h$, in particular, if it is determined that the internal temperature $T_2$ of the lubricating oil tank 51 rises to be higher than the heating target temperature $T_h$ by the set rising value H, the first and second vaporizer units 58 and 59 stop (S15). Here, when the first vaporizer unit 58 is the electric heat type heater of FIG. 2, power may be applied to the electric heat type heater to stop the first vaporizer unit 58. Further, when the second vaporizer unit 59 is the cooling water line of FIG. 3, the valve 59b is closed to pass the elevated engine cooling water through the bypass line 59a via the cooling water line, thereby stopping the second vaporizer unit 59.

In the step S14, if it is determined whether the internal temperature $T_2$ of the lubricating oil tank 51 does not rise to be higher than the heating target temperature $T_h$ by the set rising value H, the method returns to the step S13.

Describing a logic monitoring a difference in the pressure of the lubricating oil tank 510 to determine the ending of the control logic or resetting (correcting) the heating target temperature in the sub logic (S10), it is determined that a difference in a pressure change value of the lubricating oil tank 51 after a reference time lapses (S16), that is, a difference between a maximum pressure $P_{2max}$ and a minimum pressure $P_{2min}$ of the lubricating oil tank 51 is lower than a pressure setting value $P_s$ ($P_{2max} - P_{2min} < P_s$) (S17).

In step S17, if it is determined that the difference between the maximum pressure $P_{2max}$ and the minimum pressure $P_{2min}$ of the lubricating oil tank 51 is higher than the pressure setting value Ps, a regeneration logic of the lubricating oil ends (S18). Here, the pressure setting value $P_s$ is a threshold value for determining whether the liquefied working fluid in the lubricating oil tank 51 is smoothly vaporized by the heating target temperature $T_h$ of the first and second vaporizer units 58 and 59 set in the step S4. Therefore, it may be accurately determined whether the liquefied working fluid is vaporized by comparing the pressure change value of the lubricating oil tank 51 with the pressure setting value. For example, the pressure setting value $P_s$ may be approximately 5 bars.

In step S17, if it is determined that the difference between the maximum pressure $P_{2max}$ and the minimum pressure $P_{2min}$ of the lubricating oil tank 51 is lower than the pressure setting value Ps, it may be recognized that the liquefied working fluid in the lubricating oil tank 51 is not smoothly vaporized by the heating target temperature $T_h$ of the first and second vaporizer units 58 and 59 that is set in the step S4, and thus the method may return to the step S2 to reset (correct) the heating target temperature $T_h$.

Figure 7:
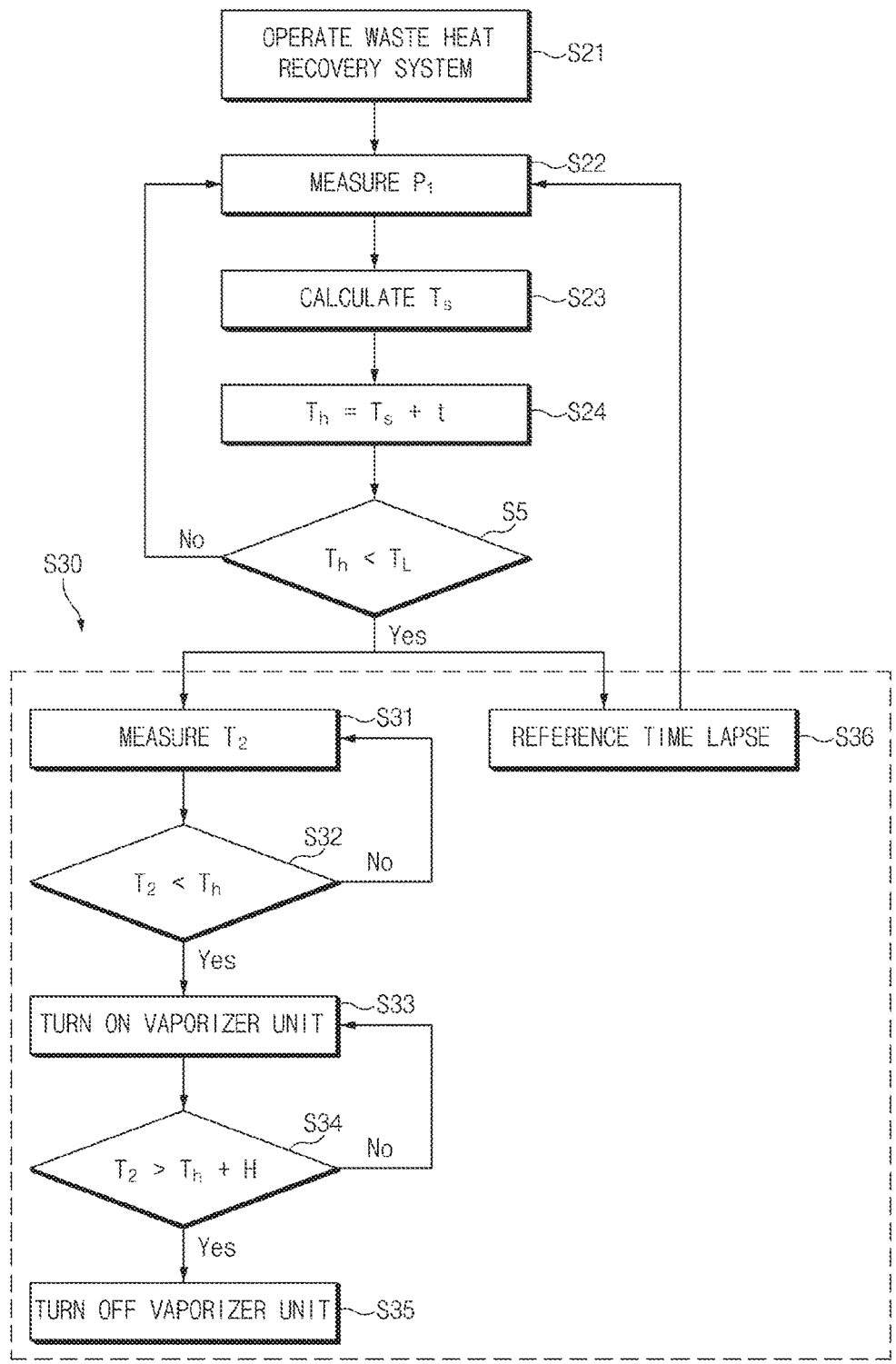
FIG. 7 is a flow chart illustrating the method for regenerating lubricating oil according to the exemplary embodiment of the present disclosure when the waste heat recovery system is operated.

FIG. 7 is a flow chart illustrating the method for regenerating lubricating oil according to the exemplary embodiment of the present disclosure when the waste heat recovery system is operated.

If the waste heat recovery system is operated (S21), the internal pressure $P_1$ of the oil separator 52 is measured by the first pressure sensor 71 (S22).

Next, the saturated vaporization temperature $T_s$ of the working fluid is calculated by substituting the internal pressure $P_1$ of the oil separator 52 into the PV diagram of the Rankine cycle, or the like (S23).

Further, the heating target temperature $T_h$ of the first and second vaporizer units 58 and 59 are set depending on the saturated steam temperature of the working fluid (S24). According to the exemplary embodiment of the present disclosure, the heating target temperature $T_h$ may be set by adding the predetermined margin t to the saturated steam temperature of the working fluid. ($T_h=T_s+t$).

Further, it is determined whether the heating target temperature $T_h$ is below the vaporization temperature $T_L$ of the lubricating oil (S25). This is to prevent the lubricating oil from being vaporized when the heating target temperature $T_h$ exceeds the vaporization temperature $T_L$ of the lubricating oil.

In the step S25, if the heating target temperature $T_h$ is equal to or higher than the vaporization temperature $T_L$ of the lubricating oil, the method returns to the step S2 and if the heating target temperature $T_h$ is below the vaporization temperature $T_L$ of the lubricating oil, a sub logic (S30) is performed.

The sub logic S30 may operate or stop the first and second vaporizer units 58 and 59 depending on the change in the internal temperature of the lubricating oil tank 51 to control the temperature of the lubricating oil tank 51 (S31, S32, S33, S34, and S35) and reset the heating target temperature depending on the predetermined reference time interval.

Describing the logic controlling the temperature of the lubricating oil tank 51 in the sub logic (S10), the internal temperature $T_2$ of the lubricating oil tank 51 is measured by the temperature sensor (S31) and it is determined whether the internal temperature $T_2$ of the lubricating oil tank 51 is lower than the heating target temperature $T_h$ (S32).

In the step S32, if the internal temperature $T_2$ of the lubricating oil tank 51 is lower than the heating target temperature Th, the first and second vaporizer units 58 and 59 are operated (S33). Here, when the first vaporizer unit 58 is the electric heat type heater of FIG. 2, power may be applied to the electric heat type heater to operate the vaporizer unit. Further, when the second vaporizer unit 59 is the cooling water line of FIG. 3, the valve 59b is opened to pass the elevated engine cooling water through the cooling water line, thereby operating the second vaporizer unit 59.

In the step S32, if the internal temperature $T_2$ of the lubricating oil tank 51 is higher than the heating target temperature Th, the method proceeds to the step S31.

Next, it is determined whether the internal temperature $T_2$ of the lubricating oil tank 51 is higher than the heating target temperature $T_h$ (S34). According to the exemplary embodiment of the present disclosure, it is determined whether the internal temperature $T_2$ of the lubricating oil tank 51 rises to be higher than the heating target temperature $T_h$ by the set rising value H ($T_2>T_h+H$) (S14). For example, the rising value H may be approximately 10° C. and therefore it is determined whether the internal temperature $T_2$ of the lubricating oil tank 51 rises 10° C. higher than the heating target temperature Th.

In the step S34, if it is determined whether the internal temperature $T_2$ of the lubricating oil tank 51 rises to be higher than the heating target temperature $T_h$ by the set rising value H, the first and second vaporizer units 58 and 59 stop (S35). Here, when the first vaporizer unit 58 is the electric heat type heater of FIG. 2, power may be applied to the electric heat type heater to stop the vaporizer unit. Further, when the second vaporizer unit 59 is the cooling water line of FIG. 3, the valve 59b is closed to pass the elevated engine cooling water through the bypass line 59a, thereby stopping the second vaporizer unit 59.

In the step S34, if it is determined whether the internal temperature $T_2$ of the lubricating oil tank 51 does not rise to be higher than the heating target temperature $T_h$ by the set rising value H, the method returns to the step S33.

In the sub logic (S30), the process returns to step S22 after the reference time lapses (S36) to reset (correct) the heating target temperature Th. As such, if the reference time lapses when the waste heat recovery system is operated, the reason of directly returning to the step S22 without considering the change in the internal pressure of the lubricating oil tank 51 is that the temperature of the lubricating oil introduced into the lubricating oil tank 51 during the operation of the waste heat recovery system is increased, and thus the liquefied working fluid may be smoothly vaporized and there is no need to determine the change in the internal pressure of the lubricating oil tank 51.

According to the exemplary embodiments of the present disclosure, the lubricating oil separated by the oil separator may be recovered to the lubricating oil tank and then the working fluid with the lubricating oil may be vaporized to be separated from the lubricating oil tank and then recovered to the oil separator again to allow the oil separator to separate the lubricating oil from the working fluid again, thereby effectively separating the working fluid within the lubricating oil tank to improve the lubrication performance of the lubricating oil and the working fluid separated within the lubricating oil tank may be recovered to the oil separator to separate the lubricating oil from the working fluid again, thereby improving the heat exchange performance of the working fluid.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:
1. An apparatus comprising:
   a lubricating oil tank configured to store a lubricating oil;

a first cylindrical part comprising an inlet to receive a working fluid mixed with the lubricating oil and an outlet for the lubricating oil and a second cylindrical part comprising an outlet for discharging the working fluid, the first and the second cylindrical parts being attached to each other and being fluidly coupled through a communication hole, the first and the second cylindrical parts forming an oil separator configured to separate the lubricating oil from the working fluid;

a lubricating oil return conduit connected to the outlet for the lubricating oil of the first cylindrical part, configured to permit the lubricating oil separated by the oil separator to flow to the lubricating oil tank;

a heating coil installed in the lubricating oil tank to vaporize a liquefied working fluid in the lubricating oil tank; and a working fluid return conduit configured to permit the working fluid vaporized by the heating coil within the lubricating oil tank to flow to the oil separator, wherein the second cylindrical part is larger in volume than the first cylindrical part.

2. The apparatus according to claim 1, wherein a one-way valve is installed on the way of the working fluid return conduit and permits a movement of the working fluid from the lubricating oil tank to the oil separator.

3. The apparatus according to claim 1, wherein the lubricating oil return conduit is provided with an opening and closing valve.

4. The apparatus according to claim 3, wherein the opening and closing valve is a floating valve that is configured to open when a pressure of the oil separator is larger than that of the lubricating oil tank.

5. An apparatus comprising:
a lubricating oil tank configured to store a lubricating oil;
an oil separator comprising
a first cylindrical part comprising an inlet to receive a working fluid mixed with the lubricating oil and an outlet for discharging the lubricating oil separated from the working fluid, and
a second cylindrical part comprising an outlet for discharging the working fluid separated from the lubricating oil, the first cylindrical part physically contacting the second cylindrical part, the second cylindrical part being larger in volume than the first cylindrical part,
a communication hole coupling the first cylindrical part with the second cylindrical part,
an annular filter disposed within the second cylindrical part;
a lubricating oil return conduit connected to the outlet for the lubricating oil of the first cylindrical part, configured to permit the lubricating oil from the outlet for the lubricating oil of the first cylindrical part to flow to the lubricating oil tank;
a heating coil disposed in the lubricating oil tank, the heating coil configured to vaporize a liquefied working fluid in the lubricating oil tank; and a working fluid return conduit configured to permit the working fluid vaporized by the heating coil within the lubricating oil tank to flow to the oil separator.

6. The apparatus according to claim 5, wherein a one-way valve is installed on the way of the working fluid return conduit and permits a movement of the working fluid from the lubricating oil tank to the oil separator.

7. The apparatus according to claim 5, wherein the lubricating oil return conduit is provided with an opening and closing valve.

8. The apparatus according to claim 7, wherein the opening and closing valve is a floating valve that is configured to open when a pressure of the oil separator is larger than that of the lubricating oil tank.

9. An apparatus comprising:
an oil separator comprising
a first cylindrical part comprising a first inlet to receive a working fluid mixed with a lubricating oil and a first outlet for discharging a fluid mixture comprising the lubricating oil and a portion of the working fluid, and
a second cylindrical part comprising a second outlet for discharging the remaining portion of the working fluid separated from the lubricating oil, the first cylindrical part physically contacting the second cylindrical part, the second cylindrical part being larger in volume than the first cylindrical part,
a communication hole coupling the first cylindrical part with the second cylindrical part,
an annular filter disposed within the second cylindrical part;
a lubricating oil tank comprising a tank inlet for receiving the fluid mixture, and a first tank outlet for outputting the lubricating oil separated from the portion of the working fluid and a second tank outlet for outputting the portion of the working fluid separated from the lubricating oil, the lubricating oil tank comprising a cooling water line or a heating coil configured to provide heat to the fluid mixture;
a lubricating oil return conduit connected to the first outlet of the first cylindrical part, and configured to permit the fluid mixture to flow to the lubricating oil tank; and
a working fluid return conduit configured to transfer the portion of the working fluid separated from the lubricating oil to the first inlet of the oil separator.

10. The apparatus according to claim 9, further comprising a lubricating oil supply conduit configured to provide a lubricating oil to an expander.

11. The apparatus according to claim 10, further comprising a lubricating oil collect conduit configured to collect lubricating oil from the expander.

12. The apparatus according to claim 10, further comprising:
a condenser coupled to the second outlet for discharging the remaining portion of the working fluid; and
a boiler fluidly coupled between the condenser and the expander so as to provide the remaining portion of the working fluid to the expander.

* * * * *